(No Model.)
F. A. MERSHON.
NUT LOCK.
No. 545,515.
Patented Sept. 3, 1895.
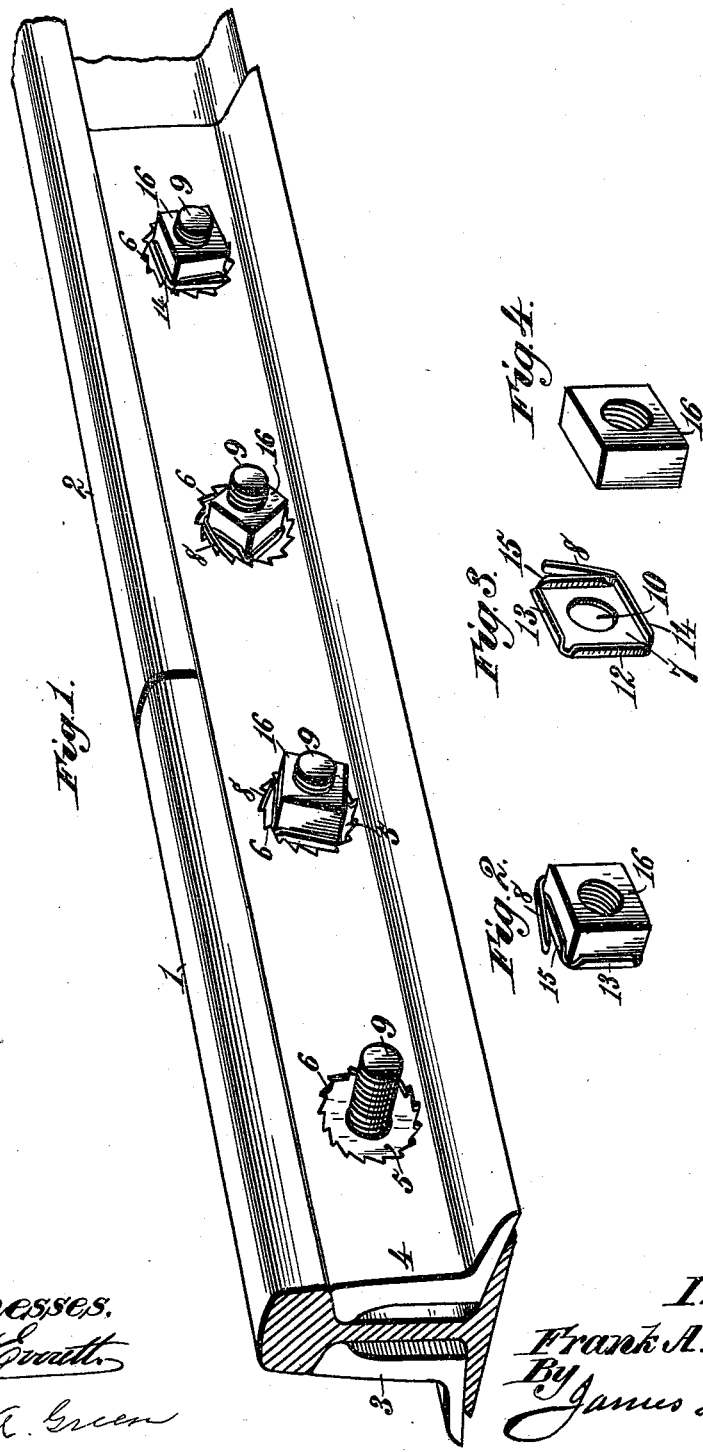
Witnesses.
Inventor
Frank A. Mershon.
By James L. Norris.
Atty.

UNITED STATES PATENT OFFICE.

FRANK A. MERSHON, OF SPARROW'S POINT, ASSIGNOR OF ONE-HALF TO RUFUS W. APPLEGARTH, OF BALTIMORE, MARYLAND.

NUT-LOCK.

SPECIFICATION forming part of Letters Patent No. 545,515, dated September 3, 1895.

Application filed February 16, 1895. Serial No. 538,679. (No model.)

*To all whom it may concern:*

Be it known that I, FRANK A. MERSHON, a citizen of the United States, residing at Sparrow's Point, in the county of Baltimore and State of Maryland, have invented new and useful Improvements in Nut-Locks, of which the following is a specification.

This invention relates to devices for locking the nuts of bolts used for various purposes— such, for example, as fastening the fish-plates applied to the adjacent or contiguous ends of railway-rails and securing sections of bridge-work, &c.

The present invention has for its object to provide new and improved means adapted to operate in connection with existing bolts and nuts, or bolts and nuts now in use, for locking the nuts against accidental movement or rotation in a direction to loosen them when subjected to jars or vibrations incident to railway or other traffic, whereby the disconnection or loosening of parts secured by the bolts or the spreading of railway-rails due to nuts becoming loose on the bolts which connect the fish-plates is effectually prevented.

To accomplish this object the invention consists, essentially, in the combination, with a rectangular plate provided with a series of depressions surrounding bolt-holes, and having circular, toothed, or ratchet edges, screw-threaded bolts and nuts, of nut-carriers, each composed of a plate having marginal flanges or rims embracing the nut and provided with an elastic pawl or tongue overhanging and spring yielding toward and from one of the flanges or rims of the nut-carrier plate and adapted to engage the circular, toothed, or ratchet edges of one of the depressions, as will be more fully hereinafter described, and pointed out in the claims.

The invention is illustrated by the accompanying drawings, in which—

Figure 1 is a broken perspective view showing my invention applied in connection with the fish-plates of railway-rails. Fig. 2 is a detail perspective view of a screw-nut, showing the nut-carrier in operative position thereupon. Fig. 3 is a detail perspective view of one of the nut carriers, and Fig. 4 is a detail perspective view of one of the nuts.

In order to enable those skilled in the art to make and use my invention, I will now describe the same in detail, referring to the drawings, wherein I have illustrated the improvement in connection with the fish-plates of railway-rails.

The numerals 1 and 2 indicate the adjacent or contiguous end portions of two railway-rails of ordinary configuration or form, and 3 and 4 the rectangular metal fish-plates, which are applied to opposite sides of the rails and bear against the under sides of the treads and against the upper sides of the base flanges in such manner that vertical displacement or movement of the fish-plates is prevented. The fish-plates are of the usual type, but one of them—for example, the plate 4—is provided at proper intervals with a series of depressions 5, having circular, toothed, or ratchet edges 6. The toothed or ratchet edges are arranged at right angles to the bottom walls of the depressions, and the diameter of each depression is such that the nut-carrier 7, hereinafter explained, can enter into the depression and render it possible for an elastic pawl or tongue 8 of the nut-carrier to engage the toothed or ratchet edge of the depression.

The bolts 9 are of the usual kind, and their heads, which lie at the side of the rail-joint opposite the side illustrated in the drawings, may be of any desired construction or shape. The size of the bolts as regards their diameter and length will be such as to meet the conditions required in fastening fish-plates to railway-rails.

The nut-carriers 7 are each composed of a flat metallic plate provided with a bolt-hole 10 at its center, and having its edges bent or struck up to form laterally-projecting flanges or rims 12, 13, 14, and 15. These flanges or rims constitute a seat for the inner or rear side of the nut 16. As here illustrated, the nut is square, and therefore the nut-carrier comprises four flanges or rims to accommodate the nut; but obviously the nut may be hexagonal or octagonal, in which event the number of flanges or rims on the nut-carrier will be correspondingly increased to fit the many sides of the nut. The elastic pawl or tongue 8 of each nut-carrier 7 constitutes a longitudinal prolongation of one of the flanges or rims—for example, the flange or rim 14, Fig. 3—and the pawl or tongue is so arranged that it overhangs one of the other flanges or rims—for example, the flange or rim 15—so that practically the elastic pawl or tongue 8 is of a width substantially the same as the thickness of the plate 7 and the height of the flange or rim 15.

When the nut 16 is inserted into its seat in the nut-carrier and the nut is screwed onto a bolt 9 and tightened up, the nut-carrier enters into the depression 5, and the elastic pawl or tongue 8 snaps into engagement with the circular, toothed, or ratchet edge 6 of the depression in such manner that while the nut can be readily tightened or turned in a direction to screw it up it cannot turn backward or in a direction to unscrew or become loose.

The construction and combination of parts described and shown provides very simple, economical, and efficient means for locking a nut on a bolt passing through the fish-plates of a railway-rail. The engagement of the elastic pawl or tongue 8 of the nut-carrier with the circular, toothed, or ratchet edge of one of the depressions 5 effectually prevents retrograde movement of the nut-carrier, and the flanges or rims of the nut-carrier, embracing the sides of the nut 16, effectually prevent the nut from turning in any direction independent of the nut-carrier. For the reasons stated it is impossible for the nut to unscrew or become loose when subjected to excessive vibration incident to railway traffic, and therefore the bolts are secured firmly at all times, and spreading of railway-rails, due to nuts becoming loose on the bolts of the fish-plates, is effectually prevented.

My invention is applicable to bolts and nuts now in existence or in use, and the improvement can be applied to ordinary railway-rail joints by simply constructing one of the fish-plates with the depressions having circular, toothed, or ratchet edges. This is very desirable and important, in that it avoids the necessity of constructing special bolts and nuts for use in connection with nut-locking devices.

In the practical use of my invention one-half of the existing or old fish-plates can be utilized, as it is only necessary to construct the fish-plates 4 with the depressions having the circular, toothed, or ratchet edges. The ordinary bolts and nuts now in use can be employed, and therefore the expense of equipping a road with my improvements is comparatively small.

The depressions 5 may be of any depth suitable for the purpose in hand; but I preferably construct each one of them about one-eighth of an inch deep. The diameter of the depressions will vary according to the size of the nuts employed on the bolts; but the diameter should be sufficient to enable the nut-carrier to enter thereinto for the purpose of enabling the elastic pawls or tongues of the nut-carriers to properly engage the circular, toothed, or ratchet edges of the depressions.

The nuts can be intentionally removed whenever occasion demands by simply pressing the elastic pawl or tongue out of engagement with the toothed or ratchet edges of the depressions and then rotating the nuts in the direction necessary to unscrew them.

I do not wish to be understood as confining my invention to securing fish-plates of railway-rails, as obviously the invention may be applied wherever the nuts of bolts are to be locked. For instance, the plate 4 may be used to connect longitudinal or other sections of bridges or of any other structure.

Having thus described my invention, what I claim is—

1. The combination with a plate formed integral with a series of depressions surrounding bolt-holes, and having circular, toothed, or ratchet edges, screw-threaded bolts, and nuts, of nut-carriers, each composed of a plate having marginal flanges or rims embracing the nut and formed with an elastic pawl or tongue overhanging and spring yielding toward and from one of the flanges or rims of the nut-carrier plate and adapted to engage the circular, toothed, or ratchet edge of one of the depressions in the said plate, substantially as described.

2. The combination with a railway-rail, a rectangular plate provided with a series of depressions surrounding bolt-holes, and having circular, toothed, or ratchet edges, screw-threaded bolts, and nuts, of nut-carriers, each composed of a plate having marginal flanges or rims to embrace the nut and provided with an elastic pawl or tongue projecting from one corner of the plate, constituting a longitudinal prolongation of one of the flanges or rims, and overhanging and spring yielding toward and from one of the other flanges or rims, so that the plate can lie against the bottom of one of the depressions while the pawl or tongue engages the circular, toothed, or ratchet edge thereof, substantially as described.

In testimony whereof I have hereunto set my hand in presence of two subscribing witnesses.

FRANK A. MERSHON.

Witnesses:
WM. V. HEAPHY,
THOS. B. C. YEARLEY.